(12) United States Patent
Nehl

(10) Patent No.: US 6,558,094 B2
(45) Date of Patent: May 6, 2003

(54) PLUG TO BE FASTENED TO HOLLOW AND SOLID BUILDING MATERIALS

(75) Inventor: Wolfgang Nehl, Waldachtal (DE)

(73) Assignee: Fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 10/069,449

(22) PCT Filed: Jan. 18, 2001

(86) PCT No.: PCT/EP01/00516

§ 371 (c)(1),
(2), (4) Date: Oct. 25, 2001

(87) PCT Pub. No.: WO01/75314

PCT Pub. Date: Oct. 11, 2001

(65) Prior Publication Data

US 2002/0122710 A1 Sep. 5, 2002

(30) Foreign Application Priority Data

Mar. 30, 2000 (DE) .......................................... 100 15 902

(51) Int. Cl.[7] ................................................. F16B 13/04
(52) U.S. Cl. ........................... 411/36; 411/42; 411/57.1; 411/60.2; 411/908
(58) Field of Search .............................. 411/15, 42, 59, 411/57.1, 60.2, 908, 34, 36–38

(56) References Cited

U.S. PATENT DOCUMENTS 3,937,122 A  2/1976 Riedel
5,312,215 A * 5/1994 Anquetin ................. 411/59 X
6,416,267 B1 * 7/2002 Nehl ...................... 411/908 X

FOREIGN PATENT DOCUMENTS

| AT | 237 869 | 1/1965 |
|----|---------|--------|
| DE | 32 08 347 C1 | 9/1983 |
| DE | 83 21 395 U | 8/1984 |
| DE | 196 00 931 A1 | 7/1997 |
| DE | 196 45 081 C1 | 6/1998 |
| DE | 197 25 719 A1 | 12/1998 |
| DE | 198 55 139 A1 | 5/2000 |
| EP | 0 037 091 A | 10/1981 |
| EP | 0 234 183 A1 | 9/1987 |
| EP | 0 560 518 A | 9/1993 |
| EP | 0 571 360 A1 | 11/1993 |
| FR | 2 505 946 A | 11/1982 |
| WO | 81 01730 A | 6/1981 |

* cited by examiner

Primary Examiner—Neill Wilson
(74) Attorney, Agent, or Firm—Michael J. Striker

(57) ABSTRACT

The invention relates to a plug (10) for fastening to hollow or panel-type building materials and to solid building materials. The invention proposes providing the plug (10) with expansion limbs (18) that extend longitudinally and that are connected to one another by thin skins (22) having a corrugation in the peripheral direction. That has the advantage of good screw guidance and a torsionally rigid construction of the plug (10); especially when fastening to hollow and panel-type building materials, undesirable backwards rotation of the plug tip (16) is avoided when screwing in an expansion screw by hand. Angled slits (32) in the plug tip (16) bring about good adaptation to screws having different diameters and different pitches of thread.

8 Claims, 3 Drawing Sheets

PLUG TO BE FASTENED TO HOLLOW AND SOLID BUILDING MATERIALS

BACKGROUND OF THE INVENTION

The invention relates to a plug for fastening to hollow building materials and to solid building materials, having the features of the preamble of claim 1. Hollow building materials are understood herein to be, for example, hollow block bricks or panels behind which there is a cavity. Solid building materials are understood to be, for example, concrete or the like.

Such plugs are known per se. They are usually made of plastics material and, in a middle region, have expansion limbs extending longitudinally and separated from one another by slits. The expansion limbs are connected to one another at a rear end by a sleeve-like plug end and at a front end by a sleeve-like plug tip. An expansion screw can be pushed through the sleeve-like plug end and screwed into the plug tip. For the purpose of fastening the plug in a solid building material, the plug is inserted in a hole drilled in the solid building material and an expansion screw is screwed into the plug. The expansion screw pushes the expansion limbs apart, that is to say the expansion screw expands the expansion limbs and, as a result, anchors the plug in the hole drilled in the solid building material.

In a hollow building material or in a panel, the plug is pushed through a drilled hole so that its sleeve-like plug end is located in the hollow building material. An expansion screw is then pushed through the plug end, guided through between the expansion limbs and screwed into the plug end. Screwing the expansion screw into the plug tip causes the plug tip to move towards the plug end, in the process of which the expansion limbs are expanded. Two possibilities for expansion are known per se. The first is that the expansion limbs bend outwards as the plug tip comes closer to the plug end and, as a result, grip behind the hollow building material in positive manner. The other possibility is that, when the expansion screw is being screwed in, the plug tip twists relative to the plug end, as a result of which the expansion limbs are wound around one another and form a knot-like structure that grips behind the hollow building material.

The known plugs have the disadvantage of poor screw guidance; when being screwed in, the expansion screw can emerge to the side through the slits between the expansion limbs. A further disadvantage of the known plugs is their low torsional rigidity, which results in resilient twisting of the plug tip relative to the plug end when the expansion screw is being screwed in. When the expansion screw is being screwed in by hand, the resilient twisting of the plug tip with respect to the plug end causes the plug tip, together with the expansion screw screwed into it, to rotate back again when a screwdriver is released for "grip changing". The consequence thereof is that the expansion screw can be screwed into the plug by hand only poorly.

SUMMARY OF THE INVENTION

The invention is based on the problem of avoiding the disadvantages mentioned above.

The problem is solved in accordance with the invention. In the plug according in which the expansion limbs are connected to one another in a peripheral direction by an expandable material. For the purpose of expandability, the material can be thinly formed and/or can be corrugated in the peripheral direction of the plug. When the plug is made from plastics material, the expandable material is preferably integral with the expansion limbs and consequently is made from the same plastics material as the rest of the plug. The expandable material in that case is preferably thinly formed as a plastic skin. As a result of the connection of the expansion limbs in the peripheral direction, the plug according to the invention is shaped like a sleeve which is closed in the peripheral direction even in the region of the expansion limbs. As a result, good guidance of the expansion screw is achieved and the expansion screw is preventing from emerging through the side of the plug between the expansion limbs, even when the expansion screw is subjected to a transverse load. A further advantage of connecting the expansion limbs in a peripheral direction is an increase in the torsional rigidity of the plug. The increased torsional rigidity firstly has the advantage that, when the expansion screw is being screwed in, the plug tip rotates together with the screw to a lesser extent, as a result of which the expansion screw can be better screwed into the plug tip. Furthermore, the increased torsional rigidity has the advantage that, when the screwing torque is released, for example when changing grip on a screwdriver, the plug tip rotates back less. As a result, the expansion screw is easier to screw into the plug, especially when it is being screwed in by hand. In addition, the plug according to the invention has the advantage that, when the expansion screw is being screwed in, there is a less pronounced drop in torque after expansion in a hollow building material has begun. In the case of the known expansion plugs, there is a marked drop in the torque once the expansion limbs have begun to bend out or wind around one another when the plug is being fastened to a hollow building material. As a result of the increased rigidity of the plug according to the invention caused by connecting its expansion limbs in a peripheral direction, that effect is, at least, smaller in is disadvantageous because it gives the false impression that the expansion screw or the plug have come away as a result of excessive force and consequently do not have a firm seating in the hollow building material.

In an embodiment of the invention, the sleeve-like plug end has a larger transverse dimension than the rest of the plug. This embodiment has the purpose of providing the plug with a good seating in a hollow or panel-type building material, in which essentially only the sleeve-like plug end of the plug is accommodated within the drilled hole and the rest of the plug is in a hollow space.

In an embodiment of the invention, a cross-section of the sleeve-like plug end has a sawtooth-like contour. This means that the plug end has radial surfaces, from the outer edge of which a contour line of the plug end extends inwards to the next radial surface in the manner of a helix contrary to the direction in which the expansion screw is screwed in. The radial surfaces are therefore oriented in the direction in which the expansion screw is screwed in. In soft building materials, they form a kind of abutment that presses into the building material and forms an anti-rotation means, which holds the plug in the building material so that it does not rotate when the expansion screw is being screwed in. Of course, the radial surfaces need not be oriented exactly radially. Especially together with the plug end having a larger cross-section compared to the rest of the plug, the sawtooth-like arrangement of the contour of the plug end provides a good anti-rotation means in soft building materials because, when the plug is introduced into a hole drilled in a soft building material, the plug end having a relatively large transverse dimension so compresses the building material in a region surrounding the plug end that the radial surfaces digging into the building material gain a good hold in the building material.

In an embodiment of the invention, the sleeve-like plug tip is provided with angled, for example V-shaped, slits, the corner (point) or tip of the slits pointing preferably towards the front or towards the rear end of the plug. As a result of being angled, the slits have one leg that has a pitch in the same direction as the pitch of the thread on the expansion screw and another leg that has a pitch in the opposite direction. The pitch of the slits in the plug tip can differ from the pitch of the thread on the expansion screw, it is merely their direction that is the same or opposite. The legs of the angled slits whose pitch is in the same direction as the thread pitch on the expansion screw serve to engage the turns of thread on the expansion screw; they bring about good adaptation to different screw diameters. The angled slits bring about reliable engagement of an expansion screw of small diameter without the expansion screw coming out of the plug tip when the expansion screw is tightened. At the same time, the angled slits avoid a large increase in torque when screwing in an expansion screw having a large screw diameter.

The legs of the angled slits whose pitch is in the opposite direction to the pitch of the thread on the expansion screw bring about axial expandability of the plug tip, as a result of which the axial spacing of angled slits provided in axial succession on the plug tip changes. By that means, adaptation to different pitches of thread on expansion screws is achieved.

In an embodiment of the invention, the plug has, within the sleeve-like plug tip, a screw channel for the expansion screw, which screw channel has a cross-section that is other than circular in shape. The screw channel within the plug tip therefore has different transverse dimensions in different directions. This measure also serves to adapt the plug to different diameters of expansion screw. In a development, the screw channel within the plug tip has a flat, for example slot-shaped, screw channel. The screw channel within the plug tip can also have the shape of two slots that cross one another.

BRIEF DESCRIPTION OF THE DRAWINGS

The invention is explained in greater detail hereinafter with reference to an exemplary embodiment illustrated in the drawing, in which.

DESCRIPTION OF THE PREFERRED EMBODIMENTS

Figure 1:
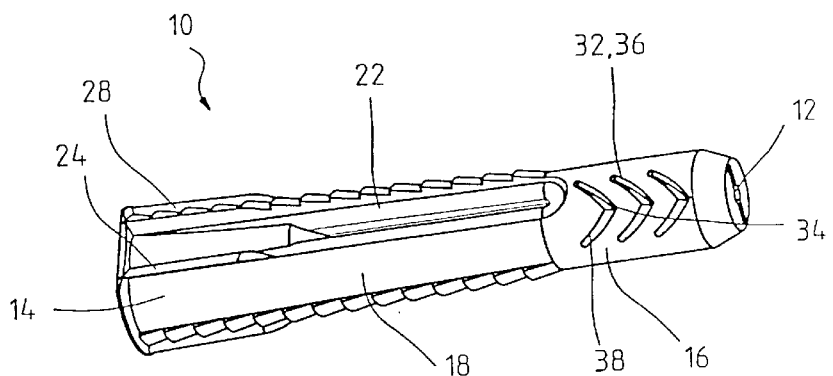
FIG. 1 is a perspective view of a plug in accordance with the invention.
Figures 2, 4:
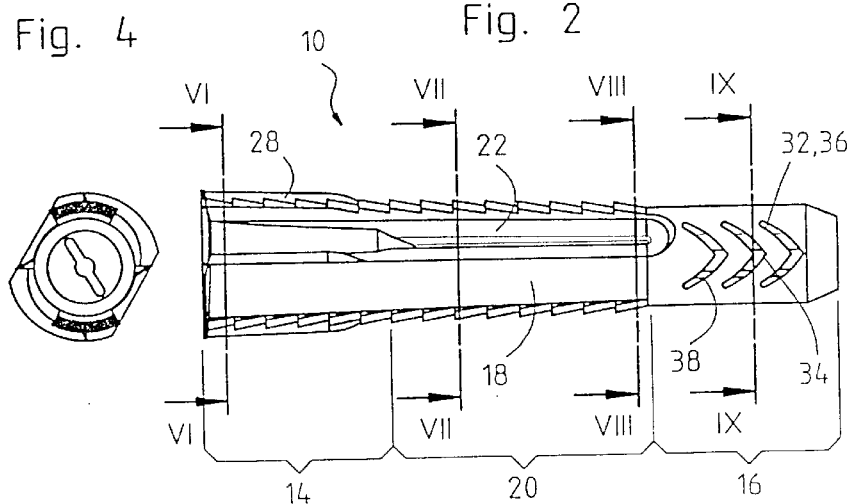
FIG. 2 is a side view of the plug in FIG. 1.
FIG. 4 is an end-on view, from behind, of the plug in FIG. 1.
Figure 5:
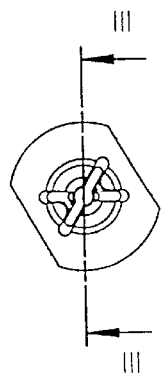
FIG. 5 is an end-on view, from the front, of the plug in FIG. 1.
Figure 3:
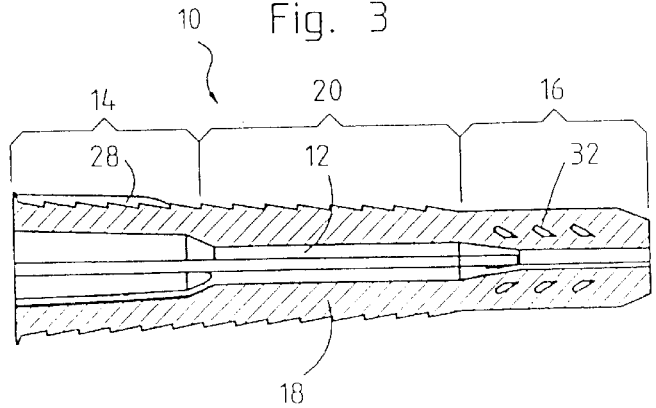
FIG. 3 is an axial section through the plug in FIG. 1.

The plug 10 according to the invention shown in FIGS. 1–3 is made from plastics material; it is shaped approximately like a sleeve. The plug 10 has a screw channel 12 (FIG. 3) for an expansion screw (not shown in FIGS. 1–3), which screw channel 12 passes through the plug 10 axially and has a conical taper at two locations.

Figure 7:
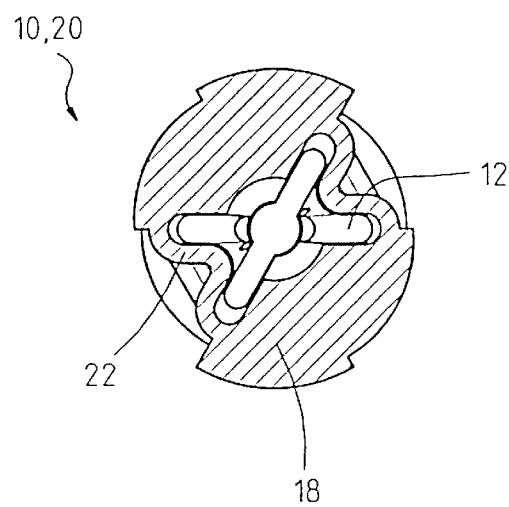
Figure 8:
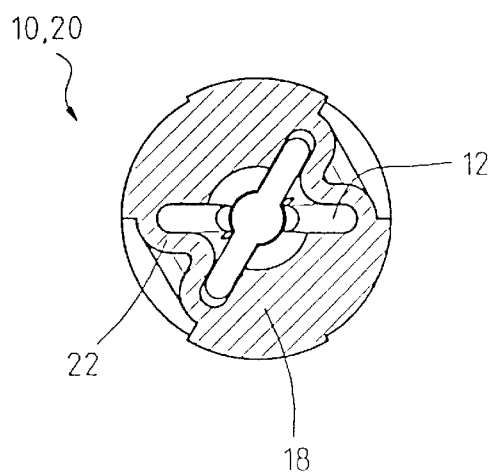

In its rear region, the plug 10 has a sleeve-like plug end 14; in its forward region it has a sleeve-like plug tip 16, the plug tip 16 being integrally connected to the plug end 14 by means of two expansion limbs 18 extending longitudinally and arranged opposite one another. The expansion limbs 18 define an expansion region 20 of the plug 10, extending from the plug end 14 to the plug tip 16. In a peripheral direction, the expansion limbs 18 are connected to one another by an expandable material 22. The expandable material 22 consists of the same plastics material as the rest of the plug 10; the expandable material 22 is an integral constituent of the plug 10. The expandable material 22 is formed as a thin skin 22, which connects the expansion limbs 18 to one another in a peripheral direction (cf. the cross-sections of the expansion region 20 in FIGS. 7 and 8). The thin skin 22 has a corrugation in the peripheral direction. The thin skin 22 is expandable in the peripheral direction of the plug 10, both as a result of its corrugation and as a result of its being thinly formed and the expandability of the plastics material; if subjected to excessive force, the thin skin 22 can tear.

Figure 6:
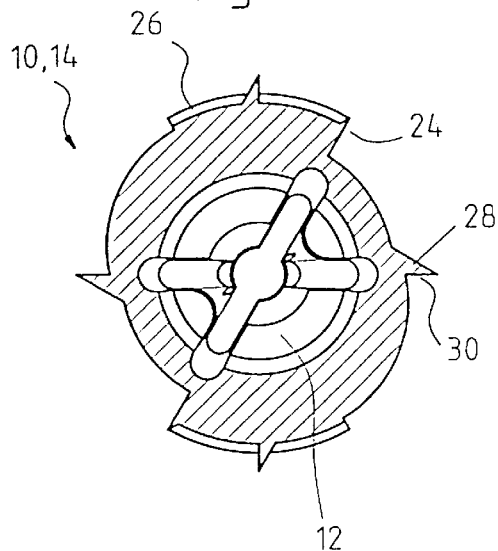
FIGS. 6–9 are cross-sections along the lines VI–VI to IX–IX in FIG. 2.

The sleeve-like plug end 14 has a larger transverse dimension or diameter than the plug tip 16 and the plug 10 in the expansion region 20, although that is hard to see in the drawing. Furthermore, the sleeve-like plug end 14 has a sawtooth-like contour, as can be seen in FIG. 6. The plug end 14 has two radial surfaces 24 lying opposite one another and facing in the screwing direction of the expansion screw (not shown in FIGS. 1–3). Adjacent to the outer edges of the radial surfaces 24 are contour lines or contour surfaces 26, which extend, contrary to the screwing direction of the expansion screw, helically inwards up to the radial surface 24 located opposite in each case. The radial surfaces 24 serve to secure the plug 10 against rotation in a drilled hole when the expansion screw is being screwed in.

Projecting out from the plug end 14, between the said radial surfaces 24, are anti-rotation ribs 28, which extend in the longitudinal direction of the plug. The anti-rotation ribs 28 have a sawtooth-shaped cross-section; their surfaces facing in the screwing direction of the expansion screw also form radial surfaces 30 of the plug 10.

The sleeve-like plug tip 16 is provided with angled slits 32, the tips or corners 34 of which are directed forwards. The slits 32 are arranged on the plug tip 16 at two locations opposite one another and several (three) slits 32 are arranged on the plug tip 16 spaced axially apart from one another. The angled slits 32 each have legs 36, 38, one leg 36 having a pitch in the same direction as the pitch of the thread of the expansion screw (not shown in FIGS. 1–3) and the other leg 38 having a pitch in the opposite direction. The pitch of the legs 36 does not need to be the same as the pitch of the thread on the expansion screw, it is merely oriented in the same direction.

Figure 9:
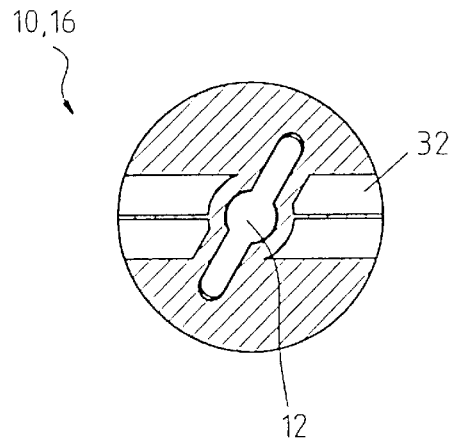

In the region of the plug end 14, the screw channel 12 has an approximately circular cross-section; in the expansion region 20 it narrows into two slots that cross one another (FIGS. 7 and 8); and in the plug tip 16 it is slot-shaped (FIG. 9). That enables the screw channel 12 to adapt well to expansion screws of different diameters.

Figure 10:
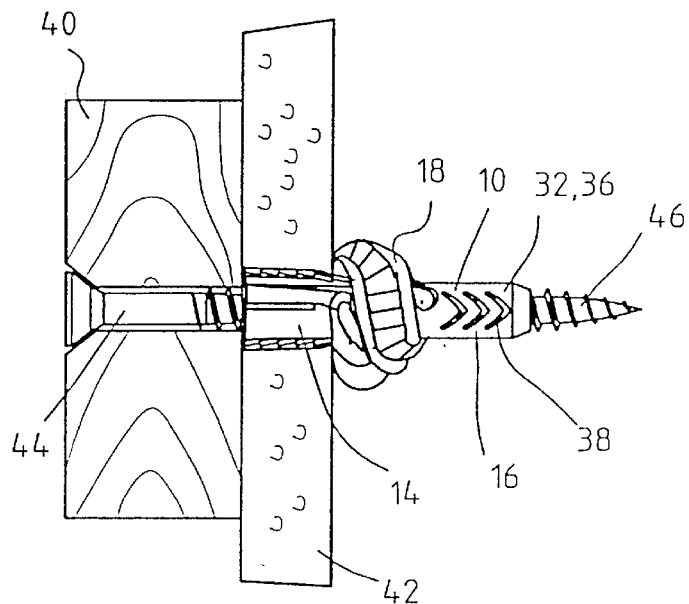
FIGS. 10 and 11 show two examples of use of the plug from FIG. 1.

The function of the plug 10 according to the invention will be described hereinbelow with reference to FIGS. 10 and 11: FIG. 10 shows the fastening of an article 40 to a panel-form building material 42. The plug 10 is inserted into a hole drilled in the panel-form building material 42. Because of the relatively large transverse dimension of the plug end 14, the plug end 14 widens the drilled hole and, in so doing, consolidates the building material surrounding the plug end 14. At the same time, the plug end 14 digs into the building material 42 by means of its sawtooth-shaped contour (FIG.

6); the radial surfaces 24, 30 form abutment surfaces preventing the plug 10 from rotating together with an expansion screw 44 when the latter is being screwed in.

After the plug 10 has been inserted, the article 40 to be fastened, provided with a drilled hole, is held up to the panel-form building material 42, and the expansion screw 44 is pushed through the article 40 and screwed into the plug 10. In the process, a screw thread 46 on the expansion screw 44 cuts into the plug tip 16 and the screw thread 46 comes into engagement with the legs 36 of the angled slits 32 having a pitch in the same direction as the screw thread 46 on the expansion screw 44. The legs 38 of the angled slits 32 having a pitch in the opposite direction enable axial expansion of the plug tip 16 so that the axial spacing between the slits 32 adapts to the thread pitch of the screw thread 46. In conjunction with the flat, slot-shaped screw channel 12 in the plug tip 16, the angled slits 32 bring about good adaptation of the plug tip 16 to the diameter of expansion screw used in a particular case and to the pitch of its screw thread 46.

When it is screwed in and tightened, the expansion screw 44 pulls the plug tip 16 towards the plug end 14; the spacing between the plug tip 16 and the plug end 14 is reduced. In the process, the expansion limbs 18 wind around one another in knot-like manner so that the expansion limbs 18 of the plug 10 grip behind the panel-form building material 42 in positive manner, which results in good anchoring of the plug 10 even in a panel-form building material 42 of low strength, for example plasterboard. The skins 22 (FIGS. 1, 2, 7, 8) connecting the expansion limbs 18 to one another in a peripheral direction bring about high torsional rigidity of the plug 10. The skins 22 counteract twisting of the plug tip 16 relative to the plug end 14 when the expansion screw 44 is being screwed in and tightened, and, as a result, they especially prevent extensive backwards rotation of the plug tip 16 on having to release a screwdriver for the purpose of changing grip when the expansion screw 44 is being screwed in by hand. Furthermore, the skins 22 avoid a pronounced drop in the screwing torque of the expansion screw 44 once the expansion limbs 18 have begun to wind around one another. Such a drop in torque would give the false impression that the expansion screw 44 had come out of the plug 10 or the plug 10 had come out of the building material 42 and was only poorly anchored.

Figure 11:
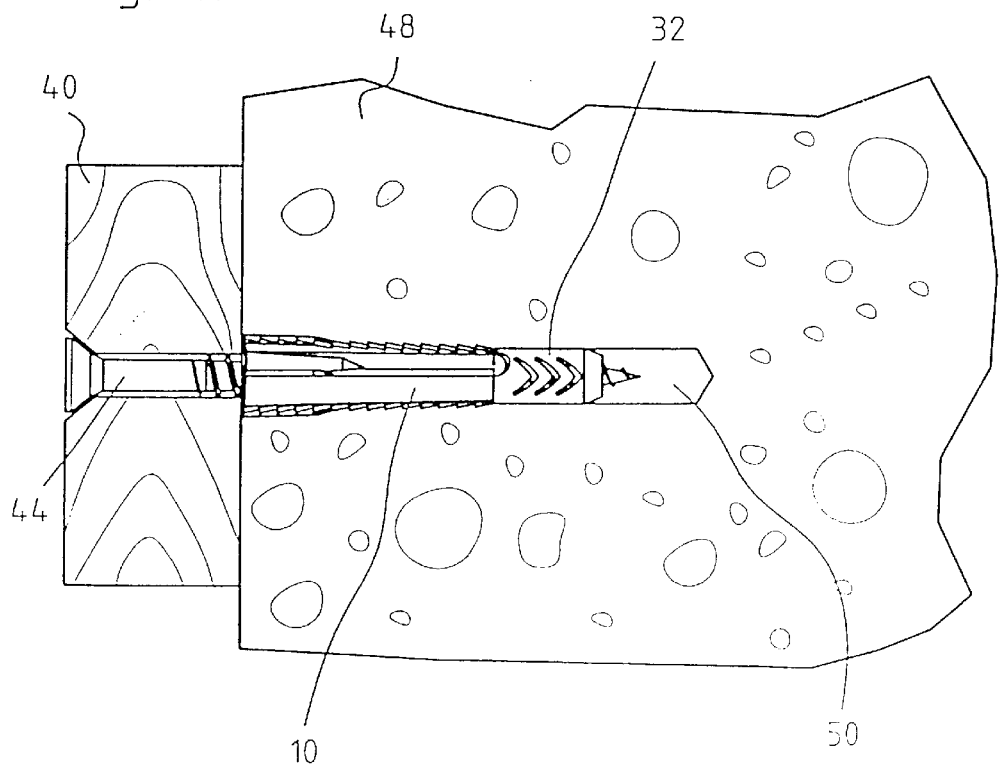

FIG. 11 shows the anchoring of an article 40 to a solid building material 48, for example concrete. In this case, the expansion plug 10 is inserted in a hole 50 drilled in the solid building material in a manner known per se, the article 40 is positioned and the expansion screw 44 is pushed through the article 40 and screwed into the plug 10. The expansion screw 44 pushes the expansion limbs 18 apart and, as a result, anchors the expansion plug 10 in the drilled hole 50. The pushing apart, that is to say expansion, of the expansion limbs 18 is not impeded by the thin skins 22 connecting the expansion limbs 18 in a peripheral direction because the skins 22 are thin and have a corrugation and are therefore expandable in a peripheral direction. The thin skins 22, which connect the expansion limbs 18 in the expansion region 20 to form a kind of sleeve, prevent the expansion screw 44 from being able to emerge through the side of the screw channel 12, between the expansion limbs 18, when it is being screwed in. Without the thin skins 22, there is a risk of that happening especially when the expansion screw 44 is loaded in a transverse direction by the article 40. The flat, slot-shaped screw channel 12 and the angled slits 32 also enable the expansion screw 44 to be screwed into a hard and unyielding solid building material 48, for example concrete, using comparatively little torque.

What is claimed is:

1. Plug for fastening to hollow building materials and to solid building materials, having expansion limbs extending longitudinally, which are arranged to expand as a result of screwing an expansion screw into the plug, the expansion limbs being connected to one another at a rear end by a sleeve-like plug end, through which like plug p, into which the expansion screw is arranged to be screwed, characterised in that the expansion limbs (18) are connected to one another in a peripheral direction by an expandable material (22), and the plug in a region of the expansion limbs (18) is shaped as a sleeve which is closed in a peripheral direction.

2. Plug according to claim 1, characterised in that the plug end (14) has a larger transverse dimension than the plug (10) in the region of the expansion limbs (18) and of the plug tip (16).

3. Plug according to claim 1, characterised in that a screw channel (12) of the plug (10) for the expansion screw (44) within the plug tip (16) has a cross-section that is other than circular in shape.

4. Plug for fastening to hollow building materials and to solid building materials, having expansion limbs extending longitudinally, which are arranged to expand as a result of screwing an expansion screw into the plug, the expansion limbs being connected to one another at a rear end by a sleeve-like plug end, through which like plug tip, into which the expansion screw is arranged to be screwed, characterised in that the expansion limbs (18) are connected to one another in a peripheral direction by an expandable material (22), and in that the plug end (14) has a cross-section that has a sawtooth-like contour, and the sawtooth shape facing in the screwing direction of the expansion screw (44).

5. Plug for fastening to hollow building materials and to solid building materials, having expansion limbs extending longitudinally, which are arranged to expand as a result of screwing an expansion screw into the plug, the expansion limbs being connected to one another at a rear end by a sleeve-like plug end, through which like plug tip, into which the expansion screw is arranged to be screwed, characterised in that the expansion limbs (18) are connected to one another in a peripheral direction by an expandable material (22), and that the plug tip (16) has angled slits (32), one leg (36) of the silts (32) having a pitch in the same direction as the pitch of the thread on the expansion screw (44) and another leg (38) having a pitch in the opposite direction.

6. Plug for fastening to hollow building materials and to solid building materials, having expansion limbs extending longitudinally, which are arranged to expand as a result of screwing an expansion screw into the plug, the expansion limbs being connected to one another at a rear end by a sleeve-like plug end, through which like plug tip, into which the expansion screw is arranged to be screwed, characterised in that the expansion limbs (18) are connected to one another in a peripheral direction by an expandable material (22), and that the screw channel (12) has a flat cross-section within the plug tip (16).

7. Plug according to claim 6, characterised in that the screw channel (12) is slot-shaped.

8. Plug according to claim 7, characterised in that the screw channel (12) has the shape of two slots that cross one another.

* * * * *